US006996162B1

(12) United States Patent
Hosur et al.

(10) Patent No.: US 6,996,162 B1
(45) Date of Patent: Feb. 7, 2006

(54) CORRELATION USING ONLY SELECTED CHIP POSITION SAMPLES IN A WIRELESS COMMUNICATION SYSTEM

(75) Inventors: Srinath Hosur, Plano, TX (US); Sundararajan Sriram, Plano, TX (US); Anand G. Dabak, Plano, TX (US); Alan Gatherer, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 715 days.

(21) Appl. No.: 09/679,487

(22) Filed: Oct. 4, 2000

Related U.S. Application Data

(60) Provisional application No. 60/157,784, filed on Oct. 5, 1999.

(51) Int. Cl.
*H04B 1/69* (2006.01)
*H04L 7/00* (2006.01)

(52) U.S. Cl. ....................................... 375/150; 375/355

(58) Field of Classification Search ................ 375/130, 375/140, 147, 150, 354, 355, 364, 365, 366
See application file for complete search history.

(56) References Cited

U.S. PATENT DOCUMENTS

| | | | | |
|---|---|---|---|---|
| 5,025,457 A * | 6/1991 | Ahmed | 375/354 |
| 5,930,706 A * | 7/1999 | Raith | 455/422.1 |
| 5,982,763 A * | 11/1999 | Sato | 370/342 |
| 6,147,982 A * | 11/2000 | Sourour et al. | 370/324 |
| 6,167,037 A * | 12/2000 | Higuchi et al. | 370/335 |
| 6,363,060 B1 * | 3/2002 | Sarkar | 370/342 |
| 6,526,091 B1 * | 2/2003 | Nystrom et al. | 375/142 |
| 6,556,620 B1 * | 4/2003 | Ohnishi | 375/149 |

FOREIGN PATENT DOCUMENTS

| | | |
|---|---|---|
| EP | 0 852 431 A2 | 7/1998 |
| EP | 0 892 528 A2 | 1/1999 |

OTHER PUBLICATIONS

"Hybrid Acquisition in DS/CDMA Forward Link", Bub-Joo Kang, et al., Vehicular Technology Conference, 1997, IEEE 47th Phoenix, AZ, USA May 4-7, 1997, New York, NY, USA, IEEE, US May 4, 1997, pp. 2123-2127, XPO10229173, ISBN: 0-7803-3659-3/97.

"Rapid PN Acquisition Algorithm Using Matched Filter and Data Sorting Method in DS/CDMA System", Sung-Chul Jung, et al., VTC 1999-Fall. IEEE VTS 50th, vol. 2, Vehicular Technology Conference, Gateway to the 21st Century Communications Village, Amsterdam, Sep. 19-22, 1999, p. 718-722, XP000924604, ISBN: 0-7803-5436-2.

* cited by examiner

*Primary Examiner*—Temesghen Ghebretinsae
*Assistant Examiner*—Sam K. Ahn
(74) *Attorney, Agent, or Firm*—Ronald O. Neerings; Wade James Brady, III; Frederick J. Telecky, Jr.

(57) ABSTRACT

A method (70) of operating a wireless receiver (UST). The method receives a wireless communicated signal, wherein the signal comprises a first synchronization channel component. The method also correlates a synchronization channel value (PSC) to the signal to produce a plurality of correlation samples in response to a correlation between the synchronization channel value and the signal. Further, the method compares (72) the plurality of correlation samples to a threshold (τ) and stores as a first set of correlation samples selected ones of the plurality of correlation samples that exceed the threshold and are within a first time sample period, wherein each of the correlation samples in the first set has a corresponding sample time relative to the first time sample period. Finally, the method combines (74) a second set of correlation samples with the first set of correlation samples.

34 Claims, 4 Drawing Sheets

CORRELATION USING ONLY SELECTED CHIP POSITION SAMPLES IN A WIRELESS COMMUNICATION SYSTEM

CROSS-REFERENCES TO RELATED APPLICATIONS

This application claims the benefit, under 35 U.S.C. §119(e)(1), of U.S. Provisional Application No. 60/157,784, filed Oct. 5, 1999.

STATEMENT REGARDING FEDERALLY SPONSORED RESEARCH OR DEVELOPMENT

Not Applicable.

BACKGROUND OF THE INVENTION

The present embodiments relate to wireless communications systems and are more particularly directed to synchronizing a receiver to a transmitter.

Wireless communications have become prevalent in business, personal, and other applications, and as a result the technology for such communications continues to advance in various areas. One such advancement includes the use of spread spectrum communications, including that of code division multiple access ("CDMA"). In such communications, a user station (e.g., a hand held cellular phone) communicates with a base station, where typically the base station corresponds to a "cell." More particularly, CDMA systems are characterized by simultaneous transmission of different data signals over a common channel by assigning each signal a unique code. This unique code is matched with a code of a selected user station within the cell to determine the proper recipient of a data signal.

CDMA continues to advance along with corresponding standards that have brought forth a next generation wideband CDMA ("WCDMA"). WCDMA includes alternative methods of data transfer, one being time division duplex ("TDD") and another being frequency division duplex ("FDD"). The present embodiments may be incorporated in either TDD or FDD and, thus, both are further introduced here. TDD data are transmitted in one of various different forms, such as quadrature phase shift keyed ("QPSK") symbols or other higher-ordered modulation schemes such as quadrature amplitude modulation ("QAM") or 8 phase shift keying ("PSK"). In any event, the symbols are transmitted in data packets of a predetermined duration or time slot. Within a TDD data frame having 15 of these slots, bi-directional communications are permitted, that is, one or more of the slots may correspond to communications from a base station to a user station while other slots in the same frame may correspond to communications from a user station to a base station. Further, the spreading factor used for TDD is relatively small, whereas FDD may use either a large or small spreading factor. FDD data are comparable in many respects to TDD including the use of 15-slot frames, although FDD permits a different frequency band for uplink communications (i.e., user to base station) versus downlink communications (i.e., base to user station), whereas TDD uses a single frequency in both directions.

By way of illustration, a prior art FDD frame FR is shown in FIG. 1. Frame FR is a fixed duration, such as 10 milliseconds long, and it is divided into equal duration slots. In the past it was proposed in connection with the 3G standard that the number of these equal duration slots equals 16, while more recently the standard has been modified such that each frame includes 15 equal duration slots. Each of the 15 slots has a duration of approximately 667 microseconds (i.e., 10/15 milliseconds). For the sake of reference, 15 such slots are shown in FIG. 1 as $SL_1$ through $SL_{15}$, and slot $SL_1$ is expanded by way of example to illustrate additional details.

To accomplish the communication from a user station to a base station, the user station must synchronize itself to a base station. This synchronization process is sometimes referred to as acquisition of the synchronization channel and is often performed in various stages. The synchronization channel, shown in expanded form as SCH in FIG. 1, includes two codes, namely, a primary synchronization code ("PSC") and a secondary synchronization code ("SSC"), as transmitted from a base station. As shown in frame FR of FIG. 1, both the PSC and SSC are included and transmitted in slot $SL_1$ for frame FR, while it should be further understood for FDD communications that the SCH is also included in each of the remaining slots $SL_2$ through $SL_{15}$, although those slots are not shown in expanded form so as to simplify the Figure. The PSC is presently a 256 chip Golay code and the same PSC code is transmitted from numerous base stations. Each base station group transmits a unique set of SSC code words. Within each slot such as slot $SL_1$, the PSC and SSC may be offset by some period of time, $T_{offset}$, within the slot. Under the present standard, $T_{offset}$ is the same for both the PSC and the SSC. However, in alternative implementations, the PSC and SSC may be offset from one another, in which case it may be stated that the PSC has an offset $T_{offset1}$ from the slot boundary and the SSC has an offset $T_{offset2}$ from the slot boundary. For the sake of an example in the remainder of this document, assume that $T_{offset1}=T_{offset2}$.

The synchronization process typically occurs when a user station is initially turned on and also thereafter when the user station, if mobile, moves from one cell to another, where this movement and the accompanying signal transitions are referred to in the art as handoff. Synchronization is required because the user station does not previously have a set timing with respect to the base station and, thus, while slots are transmitted with respect to frame boundaries by the base station, those same slots arrive at the user station while the user station is initially uninformed of the slot and frame boundaries among those slots. Consequently, the user station typically examines either one slot or one frame-width of information (i.e., 15 slots), and from that information the user station attempts to determine the location of the actual beginning of the frame ("BOF"), as transmitted, where that BOF will be included somewhere within the examined frame-width of information. Further in this regard, the PSC is detected in a first acquisition stage, which thereby informs the user station of the periodic timing of the communications, and which may further assist to identify the BOF. The SSC is detected in a later acquisition stage, which thereby informs the user station of the data location within the frame. The actual base station is identified from the third stage of the synchronization process, which may involve correlating with the midamble (in TDD) or long code (in FDD) from the base station transmissions depending on the type of communication involved. Once the specific long code/midamble from that group is ascertained, it is then usable by the user station to demodulate data received in frames from the base station.

Returning now to frame FR in general, a further discussion is presented concerning the prior art approach of detecting the PSC in a first acquisition stage. Specifically, in order to locate the PSC in a prior art FDD frame, a user station typically samples one slot-width of information and performs a PSC correlation on the sampled slot and the PSC is determined to be located within the sampled information at the position identified as having the largest correlation. For example, this technique may be implemented by applying the received information to a matched filter having the 256 chip PSC as coefficients to the filter, and then observing the absolute value (i.e., the energy) of the output of the filter. To further refine this approach, often an average is taken for successive slot-widths of correlated measurements. In this approach, the average peak over time of those correlations correspond to the location of the synchronization channel within the collected information.

While the above-described approach to stage 1 acquisition of the PSC has provided satisfactory results, the present inventors have observed various drawbacks related to that approach. Specifically, the number of correlations measured is usually twice the total chip rate, that is, the PSC correlation is measured twice for each chip included within the frame width of information. Further, the results of the PSC correlations are typically stored within a buffer as those correlations are measured. For example, for a chip rate of 3.84 Mcps, then the PSC correlations are at a rate of 7.68 million correlations per second. Further, if a slot has a duration of approximately 667 microseconds (i.e., 10 milliconds/15 slots), then a total of 5,120 samples (i.e., 2×3.84×666.666666667=5,120) are taken per slot. Also, recall it is noted above that often an average is taken for successive slots; thus, to implement this approach in the prior art, a buffer is used for a set of samples, with the average then taken by accumulating values into that buffer. In this approach, therefore, the buffer must accommodate the total number of samples taken and, thus, for the numeric example provided, a buffer having a total of 5,120 elements must be provided to store the PSC correlation values. The requirement of a large buffer may provide various disadvantages, such as increased complexity and cost. Additionally, since the user station is typically a portable and relatively small device, then resource allocation may be even more complex and, thus, disadvantages such as those just mentioned are even more pronounced in the portable device.

In view of the above, there arises a need to provide an approach for correlation measurements in a wireless system with reduced resource requirements, as is achieved by the preferred embodiments discussed below.

BRIEF SUMMARY OF THE INVENTION

In the preferred embodiment, there is a method of operating a wireless receiver. The method receives a wireless communicated signal, wherein the signal comprises a first synchronization channel component. The method also correlates a synchronization channel value to the signal to produce a plurality of correlation samples in response to a correlation between the synchronization channel value and the signal. Further, the method compares the plurality of correlation samples to a threshold and stores as a first set of correlation samples selected ones of the plurality of correlation samples that exceed the threshold and are within a first time sample period, wherein each of the correlation samples in the first set has a corresponding sample time relative to the first time sample period. Finally, the method combines a second set of correlation samples with the first set of correlation samples. Other circuits, systems, and methods are also disclosed and claimed.

DETAILED DESCRIPTION OF THE INVENTION

Figure 1:
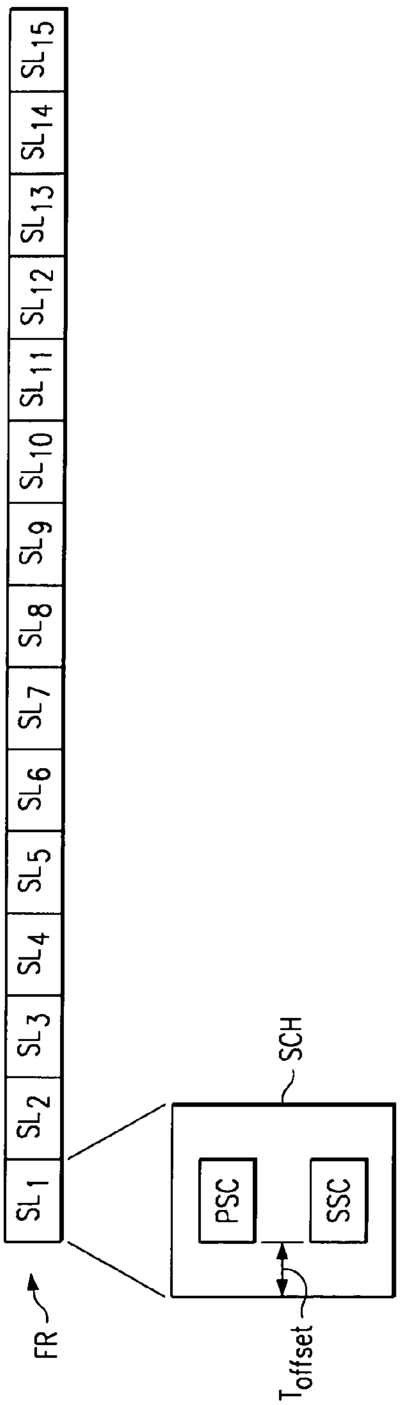
FIG. 1 illustrates a prior art frame FR divided into a number of equal-duration slots with one of the slots expanded to illustrate the primary synchronization code and the secondary synchronization code in the slot.

FIG. 1 was described in the Background Of The Invention section of this document and the reader is assumed familiar with the concepts described in that section.

Figure 2:
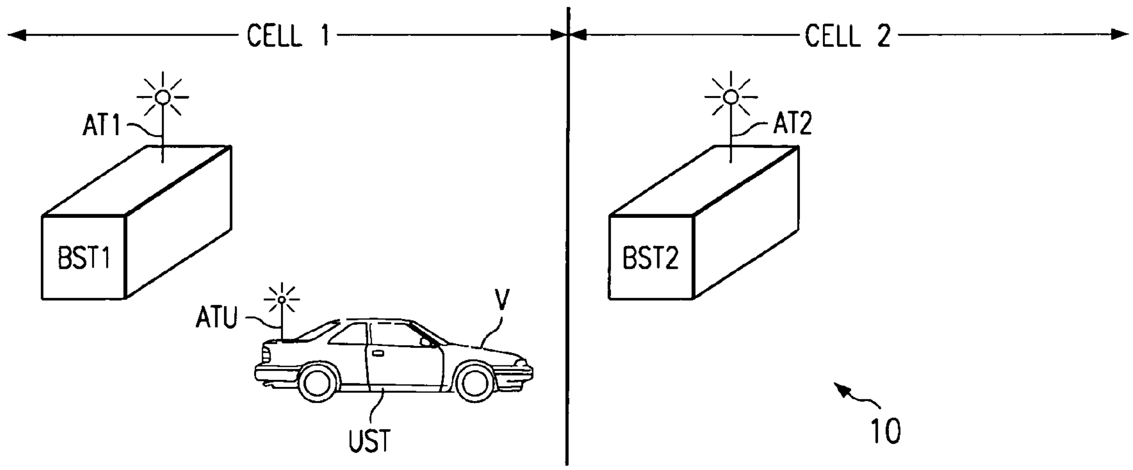
FIG. 2 illustrates a diagram of a cellular communications system 10 by way of a contemporary code division multiple access ("CDMA") or wideband CDMA ("WCDMA") example in which the preferred embodiments operate.

FIG. 2 illustrates a diagram of a cellular communications system 10 by way of a contemporary code division multiple access ("CDMA") or wideband CDMA ("WCDMA") example in which the preferred embodiments operate. Within system 10 are shown two base stations BST1 and BST2. Each base station BST1 and BST2 includes a respective antenna AT1 and AT2 from which each may transmit or receive CDMA signals. The general area of intended reach of each base station defines a corresponding cell; thus, base station BST1 is intended to generally communicate with cellular devices within Cell 1 while base station BST2 is intended to generally communicate with cellular devices within Cell 2. Of course, some overlap between the communication reach of Cells 1 and 2 exists by design to support continuous communications should a communication station move from one cell to the other. Indeed, further in this regard, system 10 also includes a user station UST, which is shown in connection with a vehicle V to demonstrate that user station UST is mobile. In addition, by way of example user station UST includes a single antenna ATU for both transmitting and receiving cellular communications.

In some respects, system 10 may operate according to known general techniques for various types of cellular or other spread spectrum communications, including CDMA communications. Such general techniques are known in the art and include the commencement of a call from user station UST and the handling of that call by either or both of base stations BST1 and BST2. Other techniques are ascertainable by one skilled in the art.

One aspect that is particularly relevant to the present inventive scope relates to synchronization of user station UST with respect to a base station BST1 or BST2 (or still others not shown). Such synchronization may occur either at start up or during handoff, which occurs when user station UST moves from one cell to another. In either of these cases or possibly others, the preferred embodiment relates to primary synchronization code ("PSC") transmissions by base stations BST1 and BST2 and the detection (or so-called "acquisition") of that code by user station UST. Once the PSC is detected, other acquisition stages may be performed, such as acquiring the secondary synchronization code ("SSC"), the long code group, and the particular long code corresponding to the specific base station, and then demodulating data from the base station using the ascertained base station long code. Given the preceding, the preferred embodiments are directed to improving the acquisition of a PSC transmitted from a base station by a user station, as further detailed below.

Figure 3:
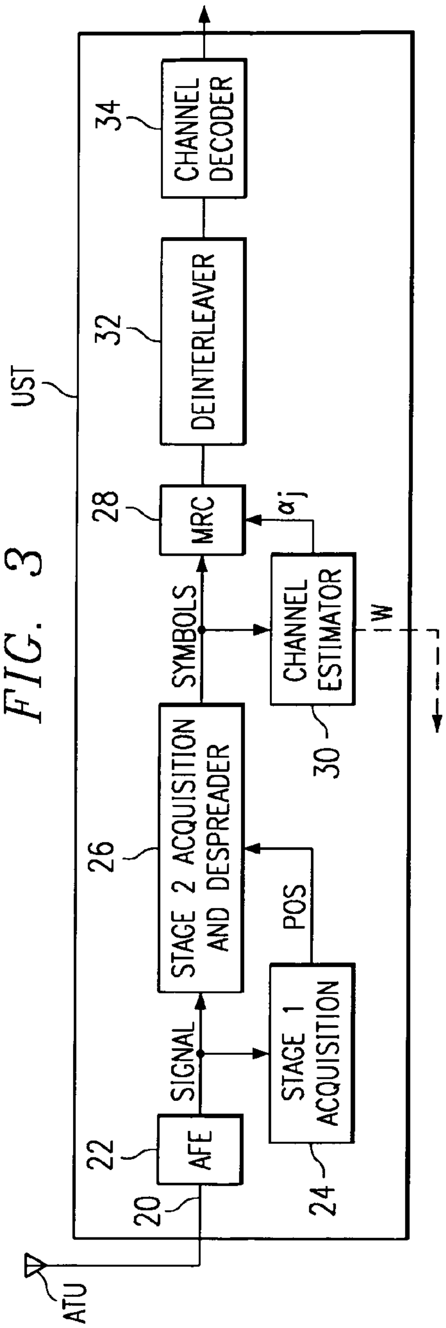
FIG. 3 illustrates a preferred embodiment of user station UST from FIG. 2 in greater detail.

FIG. 3 illustrates a preferred embodiment of user station UST in greater detail, and in which a preferred method for synchronization channel acquisition is implemented as further discussed below. By way of introduction, user station UST is shown in block diagram form where given the following discussion one skilled in the art may ascertain various different circuits and combined software and/or firmware techniques for implementing the blocks of user station UST. Further, the various blocks shown are separated to facilitate an understanding of the preferred embodiments and not by way of limitation and, thus, one skilled in the art may add other functionality to such blocks or further subdivide or combine the functions detailed below. Also, for the sake of presentation, the following discussion first examines the functionality of each block generally with some of this functionality further detailed later.

Looking to various connections in FIG. 3, antenna ATU of user station UST is for receiving communications from one or more base stations (e.g., from transmit antennas AT1 and AT2 of base stations BST1 and BST2). Within user station UST, signals received by antenna ATU are connected to an input 20, and input 20 is connected to an analog front end ("AFE") block 22. Since transmissions from each of base stations BST1 and BST2 are modulated over a radio frequency, AFE block 22 includes circuitry directed to those radio frequency modulated signals. For example, AFE block 22 includes a signal down converter to remove the radio frequency modulation, thereby providing a resulting analog signal. As another example, AFE block 22 includes analog-to-digital circuitry for converting the down-converted analog signal into a digital signal counterpart. This digital signal counterpart is output from AFE block 22 to a stage 1 acquisition block 24 and to a stage 2 acquisition and despreader block 26.

In the preferred embodiment and as detailed in additional Figures later, stage 1 acquisition block 24 acquires the PSC in the synchronization channel embedded within the digital signal provided by AFE block 22. As a result, stage 1 acquisition block 24 outputs a parameter POS to stage 2 acquisition and despreader block 26. As further detailed later, POS indicates to stage 2 acquisition and despreader block 26 the chip sample position within a slot that is the determined location of the PSC within that slot. Thus, given this position, stage 2 acquisition and despreader block 26 is likewise informed of the location of the SSC which, as shown in FIG. 1, is also part of the same SCH as is the PSC.

Stage 2 acquisition and despreader block 26 receives the digital signal from AFE block 22 and completes the acquisition of the synchronization channel in response to the POS parameter from stage 1 acquisition block 24. The completion of the synchronization channel acquisition in part responds to the POS parameter according to the preferred embodiments. Further, the completion of the acquisition of the synchronization channel also may include various of the steps associated with the prior art, such as detecting the SSC, identifying the group of midambles/long codes from the transmitting base station (i.e., BST1 or BST2), ascertaining the specific long code for that base station, and demodulating the signal in response to that specific long code/midamble. In addition, the despreading aspect of block 26 operates according to known principles, such as by multiplying the CDMA signal times the combination of the long code and the Walsh code and summing the chips to form symbols and thereby producing a despread symbol stream at its output and at the symbol rate. The despread signals output by block 26 are coupled by way of an example to an MRC block 28 and also to a channel estimator 30. Channel estimator 30 determines estimated channel impulse responses based on the incoming despread symbols. Channel estimator 30 provides these estimated channel impulse responses, illustrated in FIG. 3 as $\alpha_j$, to MRC block 28. Further, user station UST is shown by way of example as an open loop system; however, the present teachings also could be implemented in an alternative embodiment using closed loop technology, in which case channel estimator 30 also would output the estimates $\alpha_j$, or values derived from those estimates such as a weight vector W, to a feedback channel for communication back to the base station that is transmitting to user station UST. To illustrate this aspect as an option, such a feedback line is shown in FIG. 3 as a dashed line. In any event, returning to the open loop example of FIG. 3 and the communication of the channel estimates to MRC block 28, in response MRC block 28 applies the estimates to the despread symbols received from the despreading aspect of block 26. Further in this regard and although not separately shown, the MRC operation may be by way of various methods, such as using a rake receiver to combine each of the estimate-adjusted paths. Lastly, note that MRC block 28 is only one example of a type of processing in response to the channel estimates; in other embodiments, one can use the channel estimates and the despread signals corresponding to not just the desired user but also other users to perform multi-user detection/interference cancellation.

Following MRC block 28 in FIG. 3 are additional blocks/functions known in the art. For example, MRC block 28 outputs its result to a deinterleaver 32 which operates to perform an inverse of the function of an interleaver when an interleaver is included in base stations BST1 and BST2. Such an interleaver operates with respect to a block of encoded bits and shuffles the ordering of those bits so that the combination of this operation with an encoding operation exploits the time diversity of the information. For example, one shuffling technique that may be performed by such an interleaver is to receive bits in a matrix fashion such that bits are received into a matrix in a row-by-row fashion, and then those bits are output in a column-by-column fashion for further processing by the base station. In any event, therefore, deinterleaver 32 effectively operates in an opposite fashion to remove the effects on the symbols that were imposed by the corresponding base station interleaver. The output of deinterleaver 32 is connected to a channel decoder 34. Channel decoder 34 may include a Viterbi decoder, a turbo decoder, a block decoder (e.g., Reed-Solomon decoding), a combination of decoding techniques, or still other appropriate decoding schemes as known in the art. Moreover, in an alternative embodiment, channel decoder 64 could be eliminated if it is not desired to implement a forward error correction code scheme; indeed, in such a case deinterleaver 32 also could be eliminated (and the base station also would not require an interleaver). In any event, channel decoder 34 further decodes the data received at its input, typically operating with respect to certain error correcting codes, and it outputs a resulting stream of decoded symbols. Indeed, note that the probability of error for data output from channel decoder 34 is far less than that before processing by channel decoder 34. For example, under current standards, the probability of bit error in the output of channel decoder 34 may be between $10^{-3}$ and $10^{-4}$. Finally, the decoded symbol stream output by channel decoder 34 may be received and processed by additional circuitry in user station UST, although such circuitry is not shown in FIG. 3 so as to simplify the present illustration and discussion.

Figure 4:
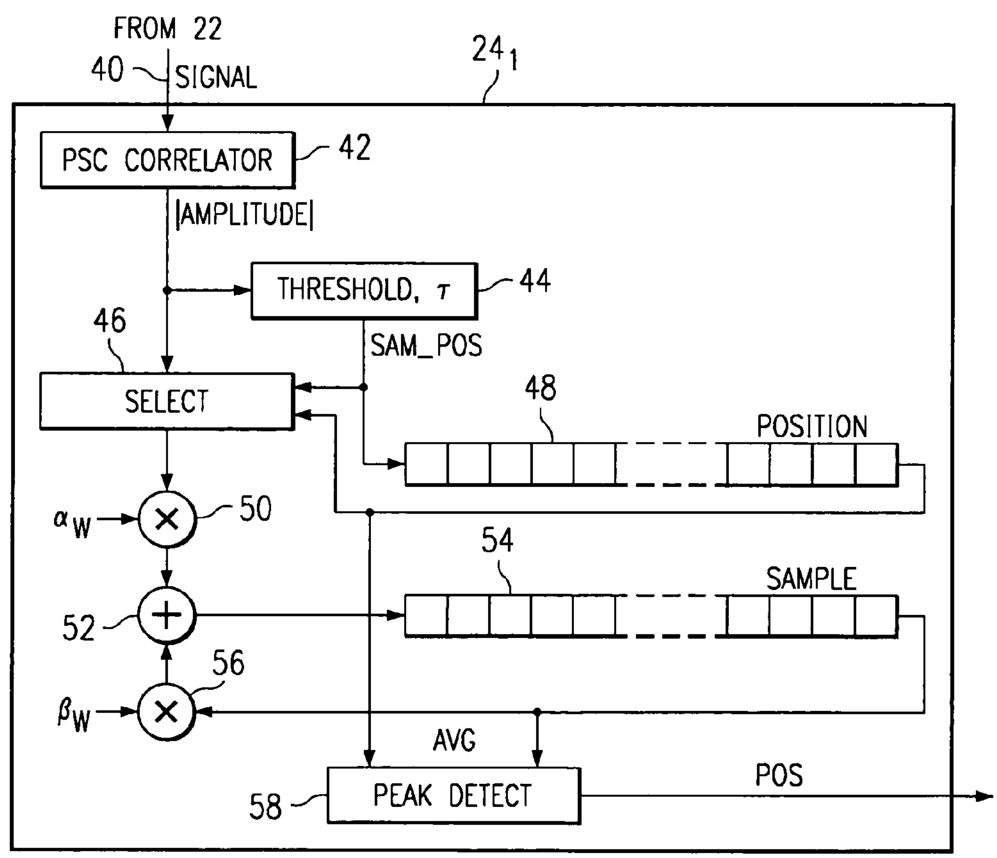
FIG. 4 illustrates, in greater detail, a block diagram of a first embodiment of stage 1 acquisition block 24 from FIG. 3 and identified at $\mathbf{24_2}$.

FIG. 4 illustrates, in greater detail, a block diagram of a first embodiment for stage 1 acquisition block 24 from FIG. 3 and which, to contrast it with later embodiments, is identified at $24_1$. Further, the following discussion again is directed to the functionality of the blocks and with it understood that one skilled in the art may implement such blocks in various forms to achieve the stated functionality. The digital frame signal from AFE block 22 is connected to an input 40 which connects the digital signal to a PSC correlator 42. PSC correlator 42 correlates the known PSC with one slot width of information from the incoming digital signal, and this determination may be achieved by way of example using a matched filter having the PSC as its coefficients. Preferably, the number of correlations measured per slot are based on the sample rate of user station UST and the chip rate for the wireless communication; thus, using the example described earlier for a chip rate of 3.84 Mcps, with samples (i.e., PSC correlation measurements) taken twice per chip and across a slot with a duration of approximately 667 microseconds, then a total of 5,120 PSC correlation measures are taken per slot. Thus, PSC correlator 42 therefore outputs a time-dependent signal representing the correlation measures of the PSC to the evaluated slot-width of signal.

In the preferred embodiment, the energy (e.g., the absolute value of the magnitude squared) values of the correlation measures by PSC correlator 42 are output and connected to a threshold circuit 44 and to a select circuit 46. Threshold circuit 44 compares the energy of each sample to a threshold, τ, and for those samples that exceed τ, threshold circuit 44 outputs the position of the sample, SAM_POS, as a control input to select circuit 46; in addition, each sample position SAM_POS is also stored in a position buffer 48, and the stored positions from position buffer 48 are also connected as a control input to select circuit 46. Note that position SAM_POS is readily determined from a counter which advances as each PSC correlation sample is taken so that the count at any given time identifies the position of the corresponding sample. Sample circuit 46 is a gating circuit that allows only selected samples connected to its input to pass to its output; more particularly, recalling that threshold circuit 44 identifies the sample position, SAM_POS, for each sample exceeding τ, then note now that the control of SAM_POS also causes select circuit 46 to output only those samples for which SAM_POS is provided, that is, in one instance select circuit 46 outputs only those samples that exceed τ. An additional instance of operation of select circuit 46 is discussed later.

The output of select circuit 46 is connected as a first multiplicand to a first multiplier 50 which also receives a weight value, $\alpha_w$, as a second multiplicand. The output of first multiplier 50 is connected as a first addend to an adder 52, and the output of adder 52 is connected to a sample buffer 54. Sample buffer 54 may be of various sizes to store an appropriate amount of energy measure samples, as further discussed later. At this point, however, and as also further detailed later, note that each sample in buffer 54 corresponds to a respective sample position stored in sample position buffer 48. Further, the values stored in sample buffer 54 are later processed to represent an average based on successive sets of energy measure samples. The output of sample buffer 54 is fed back to provide a first multiplicand to a second multiplier 56, which also receives a weight value, $\beta_w$, as a second multiplicand. The output of second multiplier 56 is connected as a second addend to adder 52. Additionally, the output of sample buffer 54 is connected to a peak detect circuit 58, which also has as an input the sample positions that, as further described below, are stored in position buffer 48. Peak detect circuit 58 is operable to detect the largest value in sample buffer 54 (i.e., the peak of those values) and to output the position of that peak as the value POS. Lastly, recall from FIG. 3 that the POS signal is connected to stage 2 acquisition and despreader block 26.

Figure 5:
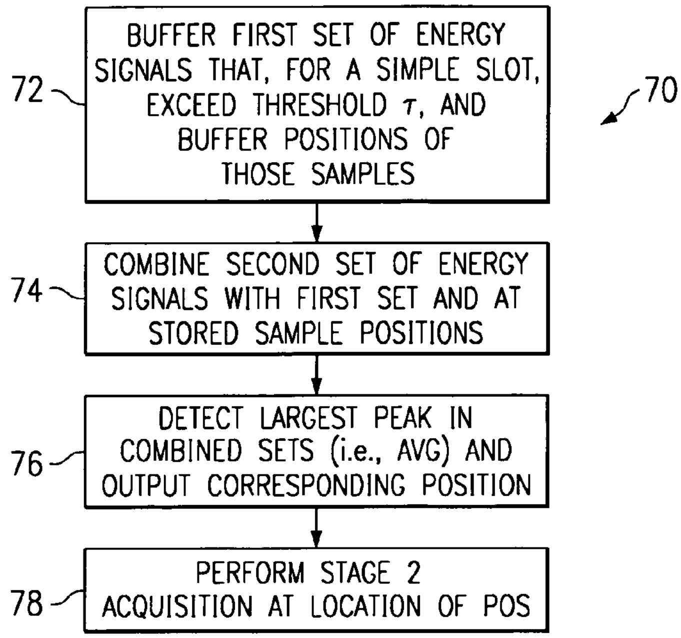
FIG. 5 illustrates a method of operation of stage 1 acquisition block 24 and the stage 2 acquisition of block 26 of FIG. 3.

FIG. 5 illustrates a method 70 of operation of stage 1 acquisition block $24_1$ of FIG. 4. Method 70 begins with a step 72 where sample buffer 54 stores a first set of energy signals in response to the output from PSC correlator 42, where each of the signals in the first set exceeds the threshold τ; at the same time, position buffer 48 stores the sample position of each respective sample stored in sample buffer 54. To achieve step 72, threshold circuit 44 evaluates a number of samples, preferably spanning over a duration equal to that of one time slot referred to for sake of reference as a first sample slot, and at a rate of two samples per chip (e.g., 5,120 samples). Note that the terminology "sample slot" is chosen to provide a timing reference for when the sample is taken by user station UST; however, because at this point in the method there is no known timing relationship between user station UST and the base station that transmitted the sampled slot, then the location of data within the sample slot likely differs from the location that each data was =transmitted in an actual slot by the base station. In any event, for each sample that exceeds τ, its position, SAM_POS, is output by circuit 44 and stored in position buffer 48, and the output of the position also causes select circuit 46 to pass the sample at that position to sample buffer 54, thereby causing a first set of threshold-exceeding samples to be stored in sample buffer 54. Note that this first set of energy signals passes through multiplier 50, and to simplify the present example assume that no weight adjustment is made, that is, assume $\alpha_w$=1. Further, because the signal set from step 72 is a first sample set, then it is a sole addend into adder 52 and it directly passes to sample buffer 54 with no further signal added to it by adder 52. Following step 72, method 70 continues to step 74.

Step 74 combines a second set of energy signals from a second sample slot with the set stored from step 72. More particularly, in step 74, the position values stored in position buffer 48 are used to control select circuit 46 so that, for the second sample slot, only those samples having relative positions that are the same as those stored in position buffer 48 are output to adder 52. In other words, for the first sample slot, each of the stored samples from step 72 will have a corresponding sample position, that is, a relative position of the sample within the first sample slot; moreover, in step 74, for the second sample slot, only those samples in that sample slot that have a like sample time within the second sample slot are output by select circuit 46, and each of those samples are combined with a respective sample from the first set having a like relative sample time. For example, if samples from the first set at positions 0, 8, 12, 15, and so forth within the first sample slot are stored in step 72, then in step 74 samples from the second set at the same positions (i.e., 0, 8, 12, 15, and so forth) are output by select circuit 46, and each of those samples are combined with the first set samples so that the two samples at position 0 of the first and second time slot are combined, and the two samples at position 8 of the first and second time slot are combined, and so forth for positions 12, 15, and any other positions stored in position buffer 48. Further, and again to simplify the present example, assume that this second set of signals passes through multiplier 50 with $\alpha_w=1$ (i.e., no weighting). Additionally, these selected samples are then combined into sample buffer 54 through the operation of adder 52, that is, the first set of samples in sample buffer 54 from step 72 are output and fed back to adder 52, through second multiplier 56, and thereby added to the second set of samples passed by select circuit 46. Also, again for simplification, assume that $\beta_w=1$ such that multiplier 56 does not weight the first sample set as it passes through that multiplier.

Before continuing with a discussion of an additional step, note that the terminology that step 74 combines the two sets of signals is used to indicate that the sets of signals may be merged with one another using various approaches. For example, the two could be only added to one another. As another example, the two could be directly averaged, that is, the sum of the two may be divided by two. As still another example, either or both of the first sample set and the second sample set may be weighted by adjusting the values of $\alpha_w$ and $\beta_w$ as desired by one skilled in the art to perform various types of scaled averaging, where one preferable type of scaling may be single pole averaging whereby the most recent sample set (e.g., the second sample set) is given greater weight than a previous sample set (e.g., the first sample set). In any event, the combination of two successive sample sets is referred to by way of reference, but not by limitation, as an average, and is designated as AVG. Thus, AVG is connected to peak detect circuit 58, which operates according to the following discussion of step 76.

After the combining operation of step 74, method 70 continues to step 76. In step 76, peak detect circuit 58 detects the largest value in AVG, which note at this point is also stored in sample buffer 54 due to the combination resulting from steps 72 and 74. Once the peak is detected, its corresponding position within the sample slots is selected from position buffer 48, and that position is output as the value POS. Thus, at this point in the discussion, one skilled in the art should appreciate that POS identifies, for at least two consecutive sample slots, the sample position of this largest PSC correlation measurement within those sample slots. Next, method 70 continues from step 76 to step 78. In step 78, block 26 (see FIG. 3) performs the stage 2 acquisition which is the acquisition of the SSC. More particularly, as known in the TDMA art, SSC detection is achieved by correlating the SSCs with a different so-called comma free code ("CFC"), where each CFC is a series of a number of different 256 chip codes. Thus, in step 78, the POS value is used as a location for the PSC which, as shown in FIG. 1, also therefore identifies the position of the SSC (because both the PSC and SSC form the SCH). Accordingly, for successively received frames, in the stage 2 acquisition a correlation is measured by user station UST according to POS and between various different CFCs and a respective one of the various different SSCs.

Having examined FIGS. 4 and 5, one skilled in the art should now appreciate that the preferred embodiment performs its stage 1 acquisition, that is, the PSC detection, by combining only selected samples from sets of samples measured across consecutive sample slots. The actual number of selected samples will depend on the value of the threshold, $\tau$. Further in this regard, $\tau$ may be established in different manners to create various different alternative embodiments. For example, in one approach, $\tau$ may be set so that the number of samples that exceed $\tau$ will equal some fraction, such as one-half, of the total number of samples taken per sample slot. In other words, for the example where 5,120 samples are measured by correlator 42 per sample slot, then $\tau$ may be set so that only 2,560 samples (i.e., ½*5,120=2,560) exceed $\tau$ and, thus, only those 2,560 samples are stored in sample buffer 54. Moreover, the present inventors have determined empirically that setting $\tau$ to a level so that only ten percent of the samples measured by PSC correlator 42 are stored will still provide satisfactory stage 1 acquisition in many instances. As yet another example, $\tau$ may be established by using an energy circuit, such as an automatic gain control circuit, to measure the level of background noise and then setting $\tau$ to exclude signals below the measured level of noise. Accordingly, these examples as well as others ascertainable by one skilled in the art therefore demonstrate that the value of $\tau$ thereby establishes the necessary storage space required for sample buffer 54. Thus, so long as $\tau$ is set so that one or more samples from PSC correlator 42 do not exceed $\tau$, then the total number of samples stored in buffer 54, per sample slot, will be less than the prior art since the prior art stores all such samples. Further, therefore, one skilled in the art may establish a tradeoff in that by increasing $\tau$, a lesser number of samples are required for storage, while performance may be reduced if $\tau$ is overly increased to a value that is relatively high. In any event, by carefully establishing $\tau$, one skilled in the art may eliminate the storage of most samples from PSC corelator 42, and indeed most of those samples will merely represent noise because they do not correlate well with the PSC and therefore the preferred embodiment eliminates the need for storing or combining these noise representations.

Figure 6:
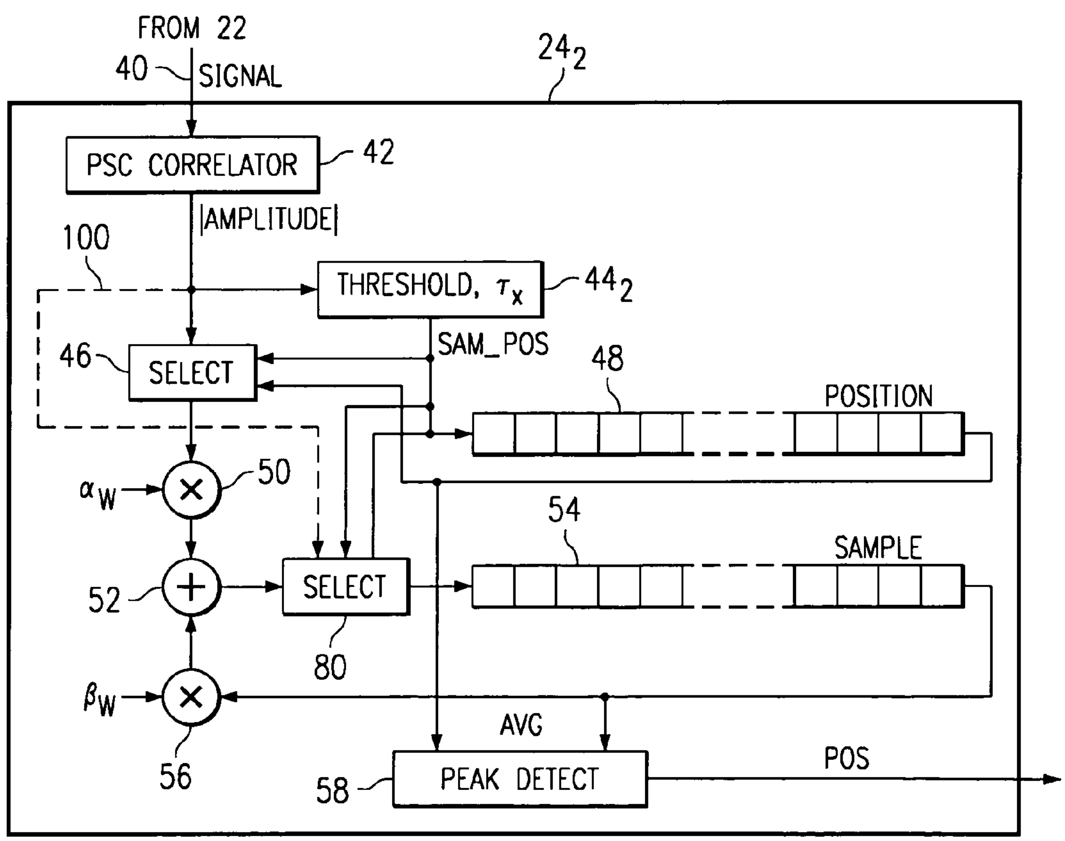
FIG. 6 illustrates, in greater detail, a block diagram of a first embodiment of stage 1 acquisition block 24 from FIG. 3 and identified at $\mathbf{24_2}$.

FIG. 6 illustrates, in greater detail, a block diagram of a second embodiment of stage 1 acquisition block 24 from FIG. 3 and identified at $24_2$. Block $24_2$ shares many of the same blocks as block 24, from FIG. 4 and, where such like blocks are used, like reference numbers are carried forward from FIG. 4 to FIG. 6. Further, for detail to such common blocks the reader is referred to the earlier discussion of FIG. 4. Looking to a first difference between block $24_2$ versus block $24_1$, block $24_2$ uses a block $44_2$ in place of block 44, where the difference is that different thresholds may be used and, thus, these various different thresholds are designated generally as $\tau_x$, where x may be different values to represent different threshold values during different steps of operation of block $24_2$ as further appreciated later. As another difference, block $24_2$ includes a select circuit 80 coupled between the output of adder 52 and the input of sample buffer 54; additionally, select circuit 80 is controlled by the threshold value, $\tau_x$, from block $44_2$ and it is also operable to affect the position values stored in position buffer 48.

Figure 7:
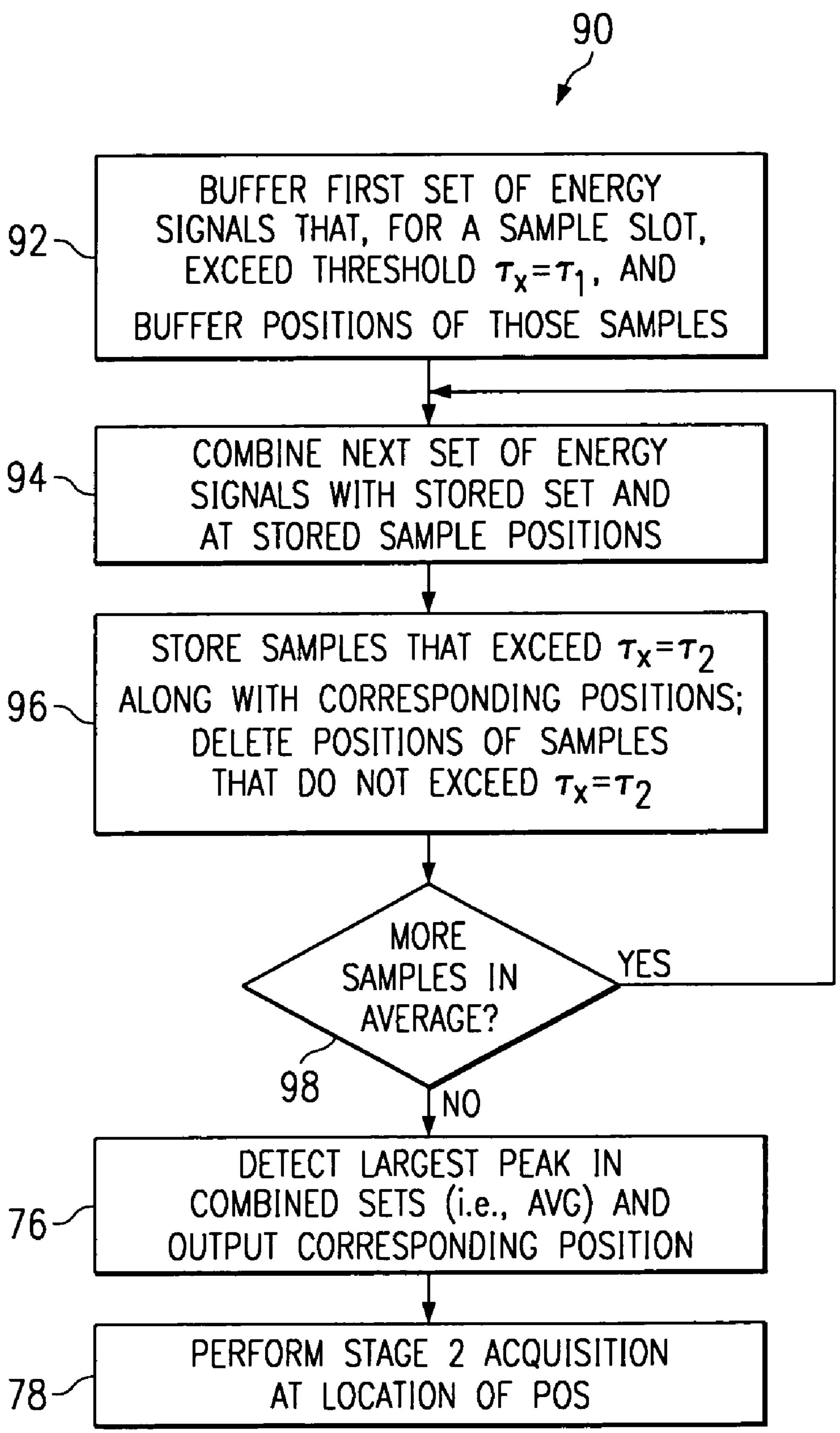
FIG. 7 illustrates a method of operation of stage 1 acquisition block $\mathbf{24_2}$ and the stage 2 acquisition of block 26 of FIG. 6.

FIG. 7 illustrates a method 90 of operation of stage 1 acquisition block $24_2$ of FIG. 6. Method 90 begins with a step 92 which is similar to step 72 of FIG. 5, with the difference that the threshold is now established by setting $\tau_x$ to a first threshold value which may be represented as $\tau_1$. Thus, in step 92, for each sample that exceeds $\tau_1$, it is passed to multiplier 50, and again assume for sake of simplification that this first set of signals passes through multiplier 50 with $\alpha_w=1$ (i.e., no weighting). The passed signals continue to adder 52 and are then output to select circuit 80. Further, select circuit 80 receives the same threshold value $\tau_1$, and, thus, it simply allows these samples to further pass to be stored within sample buffer 54. Thus, each of the signals in the first stored set exceeds $\tau_1$. Also, at the same time the samples are stored, position buffer 48 stores the sample position of each respective sample stored in sample buffer 54. Next, method 90 continues to step 94.

Step 94 is comparable to step 74 from FIG. 5, but it is described in connection with a next set of energy signals rather than just a second set because, as appreciated later, more than two sets may be combined by method 90. To simplify this aspect at this point, assuming that only one set of samples has been stored in sample buffer 54, and with their corresponding positions stored in position buffer 48, then step 94 uses the stored positions in position buffer 48 to control select circuit 46 so that only those samples from a second set and having a like position to the positions already stored in position buffer 48 are output to multiplier 50 and then to adder 52, and again assuming no weighting by multiplier 50 to simplify the example. Moreover, adder 52 also receives, from multiplier 56, the samples previously stored in sample buffer 54 (also assuming that $\beta_w=1$ such that multiplier 56 does not weight the first sample set as it passes through that multiplier). At this point, however, recall that the output of adder 52 is connected to select circuit 80. The result of this connection is appreciated from the following discussion, where method 90 continues from step 94 to step 96.

In step 96, select circuit may further filter the output of adder 52, that is, it may filter the combined (i.e., added and possibly weighted and averaged) signals from step 94. Specifically, during step 96, select circuit 80 operates in response to a different threshold, $\tau_2$, as provided by threshold circuit $\mathbf{44}_2$. More particularly, during step 96, only those combined samples that exceed $\tau_2$ are allowed to pass to select circuit 80 and thereby be stored within sample buffer 54. At the same time, only the positions of those same $\tau_2$-exceeding samples are stored within position buffer 48 and its corresponding sample stored from earlier set is deleted or otherwise invalidated. Moreover, for any combined sample that does not exceed $\tau_2$, then its position is deleted from position buffer 48. Thus, by the conclusion of step 96, method 90 has selectively combined only some of the second set of energy signals from a second sample slot with the set stored from step 92, where the selection is in response to both $\tau_1$ and $\tau_2$. Next, method 90 continues from step 96 to step 98.

Step 98 allows the method to stop any further averaging of the successive sets or, alternatively, if desired, still additional sets of signals may be averaged. For example, if two sets have been combined (in response to both $\tau_1$ and $\tau_2$) thus far, and it is desired to accumulate yet another set, then step 98 returns the flow to steps 94 and 96, which next will proceed under another threshold, $\tau_3$, and $\tau_3$ may equal either $\tau_1$ or $\tau_2$ or may be yet another value. Still further, one skilled in the art will appreciate that after steps 94 and 96 conclude for an additional set of signals, once more step 98 is reached, and this process may continue in a circular fashion until any desired number of sets are combined, and using any desired number of thresholds. Once no more samples are desired for the average, method 90 continues from step 98 to steps 76 and 78.

Steps 76 and 78 operate in the same manner as in FIG. 5 above. Briefly addressing those steps as further detailed above, step 76 detects the largest value in AVG and its corresponding position from position buffer 48 is output as the value POS. Additionally, step 78 performs the stage 2 acquisition of the SSC.

Having demonstrated the blocks and operation of stage 1 acquisition block $\mathbf{24}_2$, note that block $\mathbf{24}_2$ may accomplish the same operation as block 24, from FIG. 4 by setting the value of $\tau_2$ equal to zero. In such a case, method 90 demonstrates that step 92 will operate in the same manner as step 72 to buffer a first set of samples and their corresponding positions. Next, step 94 will combine a second set of samples with the first set at the same relative positions as stored in position buffer 48, and with $\tau_2$ equal to zero then step 96 will allow all of these combined samples to pass through select circuit 80 and to be stored within sample buffer 54.

As still another embodiment for stage 1 acquisition block 24, note that a dashed line 100 is also shown in FIG. 6 from the output of PSC correlator 42 directly to select circuit 80. Given this additional connection, still another method of operation may be achieved. First, regardless of connection 100, this alternate embodiment may operate according to method 90 of FIG. 7. Additionally, however, connection 100 permits new positions to be added to position buffer 48 once they have been initially not included therein or after they have been excluded from position buffer 48. Specifically, each time a set of signals is output by PSC correlator 42, connection 100 permits any of those signals which exceed the then-used threshold $\tau_x$ to be added to the then-existing stored samples positions in buffer 54. For example, assume three sample sets have been combined by block $\mathbf{24}_2$ according to thresholds $\tau_1$ through $\tau_3$ and, thus, at this point position buffer 48 stores the positions of the samples in those sets and the averages of those sample sets are stored in sample buffer 54. Next, assume a fourth sample set is to be combined with the average of the three samples and using a threshold of 14, but assume further that the fourth sample set includes a sample at a position N which exceeds $\tau_4$ and assume that none of the samples at position N in the first three sets exceeded the threshold applied to those samples (i.e., $\tau_1$ through $\tau_3$, respectively). Accordingly, under the operation of method 90, then position N is not currently stored in position buffer 48. However, with the addition of connection 100, select circuit 80 compares each sample in the current set to the current threshold (e.g., $\tau_4$), and if the set includes a sample which now exceeds the threshold then that sample is stored in sample buffer 54 and its position is stored in position buffer 48. Thus, using this additional connections, earlier sample positions that were excluded or removed from position buffer 48 may be added thereto.

From the above, it may be appreciated that the above embodiments provide an improved system and method for identifying a synchronization channel with a sequence of received slots. The preceding also has demonstrated various alternatives that are within the present inventive scope. Indeed, in addition to the various options provided above, still others are contemplated within the present inventive scope. For example, while the preceding example is applied in the context of user station synchronization, one skilled in the art may possibly adapt these teachings to synchronization by a base station. As another example, while the preferred embodiment has been shown in an application to CDMA (e.g., WCDMA), and the FDD data transfer technique thereof, the present teachings may apply to other wireless communication formats. For example, the TDD format of WCDMA also includes a periodic correlation measurement of its PSC, where the PSC is located in two slots per frame rather than in all slots as described above relative to FDD. Accordingly, one skilled in the art may readily implement the present inventive teachings in a TDD system so that, for those groups of signals that are sampled by correlations, only samples exceeding a threshold are stored and combined for purposes of detecting the peak value in those correlations; moreover, note in such a TDD system that the correlations may be over larger duration periods such as an entire frame-width of information. Moreover, by establishing a satisfactory value for τ, a considerably lesser amount of those frame width of correlations will require buffering. As still another example, while method 70 preferably forms AVG by combining only two successive sample slots, a different number of slots may be combined. As another example, while the preferred embodiment is directed to averaging correlations with respect to a PSC, other correlation measurements may benefit from the inventive teachings. As still another example, while peak detect circuit 58 has been described to provide only a single maximum peak as the value for POS, in other embodiments a larger number of peaks may be detected and presented as the POS signal; for example, to respond further to the possibility of multipaths, two peaks may be detected by peak detect circuit 58 and provided in the value for POS. As yet a final example, while a preferred embodiment is illustrated in the example of a WCDMA sequence having fifteen slots, still other communication data streams may be analyzed using the preceding inventive teachings. Consequently, while the present embodiments have been described in detail, various substitutions, modifications or alterations could be made to the descriptions set forth above without departing from the inventive scope which is defined by the following claims.

We claim:

1. A method of operating a wireless receiver, comprising the steps of:

receiving a wireless communicated signal, wherein the wireless communicated signal comprises a first synchronization channel component;

correlating a synchronization channel value to the wireless communicated signal to produce a plurality of correlation samples in response to a correlation between the synchronization channel value and the wireless communicated signal;

comparing the plurality of correlation samples to a threshold;

storing as a first set of correlation samples selected ones of the plurality of correlation samples that exceed the threshold and are within a first time sample period and not storing other correlation samples that do not exceed the threshold and are within the first time sample period, wherein each of the correlation samples in the first set has a corresponding sample time relative to the first time sample period; and combining a second set of correlation samples with the first set of correlation samples to form an average sample set and further comprising combining additional sets of correlation samples with the average sample set, wherein each of the additional set of correlation samples has a corresponding sample time; and wherein the combining step comprises combining each sample in each of said additional set of correlation samples with a respective sample in the average sample set such that each combined sample has a like sample time relative to the first time sample period.

2. The method of claim 1:

wherein the second set of correlation samples are within a second time sample period;

wherein each of the correlation samples in the second set has a corresponding sample time relative to the second time sample period; and wherein the combining step comprises combining each sample in the second set of correlation samples with a respective sample in the first set of correlation samples such that each combined sample has a like sample time relative to the first and second time sample period.

3. The method of claim 2:

wherein the wireless communicated signal comprises a plurality of time slots, and wherein each of the plurality of time slots comprises the first synchronization channel component; and wherein each of the first time sample period and the second time sample period has a duration equal to each of the plurality of time slots.

4. The method of claim 3:

wherein the plurality of correlation samples consists of an integer number N correlation samples;

wherein the selected ones of the plurality of correlation samples that exceed the threshold consist of an integer number M selected ones of the plurality of correlation samples; and wherein the threshold is at a level such that the integer number M is approximately one-half of the integer number N.

5. The method of claim 3:

wherein the plurality of correlation samples consists of an integer number N correlation samples;

wherein the selected ones of the plurality of correlation samples that exceed the threshold consist of an integer number M selected ones of the plurality of correlation samples; and wherein the threshold is at a level such that the integer number M is approximately one-tenth of the integer number N.

6. The method of claim 1:

wherein the plurality of correlation samples consists of an integer number N correlation samples;

wherein the selected ones of the plurality of correlation samples that exceed the threshold consist of an integer number M selected ones of the plurality of correlation samples; and wherein the threshold is at a level such that the integer number M is approximately one half of the integer number N.

7. The method of claim 1:

wherein the plurality of correlation samples consists of an integer number N correlation samples;

wherein the selected ones of the plurality of correlation samples that exceed the threshold consist of an integer number M selected ones of the plurality of correlation samples; and wherein the threshold is at a level such that the integer number M is approximately one-tenth of the integer number N.

8. The method of claim 1:

wherein the plurality of correlation samples consists of an integer number N correlation samples;

wherein the selected ones of the plurality of correlation samples that exceed the threshold consist of an integer number M selected ones of the plurality of correlation samples; and wherein the threshold is at a level such that the integer number M is less than the integer number N.

9. The method of claim 1 wherein the step of combining comprises forming a sum by adding the first set to the second set.

10. The method of claim 9 wherein the step of combining further comprises dividing the sum by two.

11. The method of claim 1 wherein the step of combining comprises forming a scaled average with the first set and the second set.

12. The method of claim 1 wherein the step of combining comprises forming a single pole average with the first set and the second set.

13. The method of claim 1 wherein each of the plurality of correlation samples comprises an energy measure of a result of the step of correlating a first synchronization channel value to the wireless communicated signal.

14. The method of claim 1:

wherein the step of combining a second set of correlation samples with the first set of correlation samples produces a plurality of combined samples; and further comprising the steps of:

determining a peak value in the plurality of combined samples; and determining a time position of the peak value.

15. The method of claim 1 wherein the wireless receiver comprises a user station wireless receiver.

16. The method of claim 1 wherein the step of receiving a wireless communicated signal comprises receiving a CDMA TDD wireless communicated signal.

17. The method of claim 1 wherein the step of receiving a wireless communicated signal comprises receiving a CDMA FDD wireless communicated signal.

18. The method of claim 1 and further comprising the steps of:

measuring a level of noise in the wireless communicated signal; and setting the threshold in response to the level of noise.

19. The method of claim 1:

wherein the second set of correlation samples are within a second time sample period;

wherein each of the correlation samples in the second set has a corresponding sample time relative to the second time sample period;

wherein the combining step produces a plurality of combined samples and comprises combining each sample in the second set of correlation samples with a respective sample in the first set of correlation samples such that each combined sample has a like sample time relative to the first and second time sample period; and further comprising the steps of:

determining a peak value in the plurality of combined samples; and determining a time position of the peak value.

20. The method of claim 19:

wherein the wireless communicated signal further comprises a secondary synchronization channel component; and further comprising, in response to the time position of the peak value, the step of acquiring the secondary synchronization channel component.

21. The method of claim 1:

wherein the threshold comprises a first threshold;

wherein the second set of correlation samples are within a second time sample period;

wherein each of the correlation samples in the second set has a corresponding sample time relative to the second time sample period;

wherein the combining step comprises combining each sample in the second set of correlation samples with a respective sample in the first set of correlation samples such that each combined sample has a like sample time relative to the first and second time sample period; and further comprising the steps of:

forming an average sample set by comparing each of the plurality of combined samples to a second threshold, wherein the second threshold is different than the first threshold;

determining a peak value in the average sample set; and determining a time position of the peak value.

22. The method of claim 1 and further comprising, after each stop of combining an additional set of correlation samples with the average sample set, the steps of:

comparing each sample in the average sample set with a corresponding threshold and storing those samples in the average sample set that exceed the corresponding threshold;

determining a peak value among the stored samples; and determining a time position of the peak value.

23. The method of claim 1 and further comprising storing a sample time position for each sample in the first set of correlation samples.

24. The method of claim 23:

wherein the second set of correlation samples are within a second time sample period;

wherein each of the correlation samples in the second set has a corresponding sample time relative to the second time sample period; and wherein the combining step comprises, in response to the stored sample time positions, combining each sample in the second set of correlation samples with a respective sample in the first set of correlation samples such that each combined sample has a like sample time relative to the first and second time sample period.

25. The method of claim 24:

wherein the threshold comprises a first threshold;

and further comprising the step of storing additional time positions for any sample correlations in the second time sample period that exceed a second threshold, wherein the second threshold differs from the first threshold.

26. A method of operating a wireless receiver, comprising the steps of:

receiving a wireless communicated signal, wherein the wireless communicated signal comprises a first synchronization channel component;

correlating a synchronization channel value to the wireless communicated signal to produce a plurality of correlation samples in response to a correlation between the synchronization channel value and the wireless communicated signal;

comparing the plurality of correlation samples to a threshold;

storing as a first set of correlation samples selected ones of the plurality of correlation samples that exceed the threshold and are within a first time sample period and not storing other correlation samples that do not exceed the threshold and are within the first time sample period, wherein each of the correlation samples in the first set has a corresponding sample time relative to the first time sample period;

combining a second set of correlation samples with the first set of correlation samples to produce a plurality of combined samples;

determining a peak value in the plurality of combined samples;

determining a time position of the peak value;

wherein the wireless communicated signal further comprises a secondary synchronization channel component; and further comprising, in response to the time position of the peak value, the step of correlating a plurality of comma free codes with the secondary synchronization code component.

27. A wireless receiver, comprising:

circuitry for receiving a wireless communicated signal, wherein the wireless communicated signal comprises a first synchronization channel component and a second synchronization channel component;

circuitry for correlating a synchronization channel value to the wireless communicated signal to produce a plurality of correlation samples in response to a correlation between the synchronization channel value and the wireless communicated signal;

circuitry for comparing the plurality of correlation samples to a threshold;

circuitry for storing as a first set of correlation samples selected ones of the plurality of correlation samples that exceed the threshold and are within a first time sample period and not storing other correlation samples that do not exceed the threshold and are within the first time sample period, wherein each of the correlation samples in the first set has a corresponding sample time relative to the first time sample period; and circuitry for combing a second set of correlation samples with the first set of correlation samples to produce a plurality of combined samples;

circuitry for determining a peak value in the plurality of combined samples;

circuitry for determining a time position of the peak value;

wherein the wireless communicated signal further comprises a secondary synchronization channel component; and further comprising, in response to the time position of the peak value, circuitry for correlating a plurality of comma free codes with the secondary synchronization channel component.

28. The wireless receiver of claim 27:

wherein the second set of correlation samples are within a second time sample period;

wherein each of the correlation samples in the second set has a corresponding sample time relative to the second time sample period; and wherein the circuitry for combining comprises circuitry for combining each sample in the second set of correlation samples with a respective sample in the first set of correlation samples such that each combined sample has a like sample time relative to the first and second time sample period.

29. The wireless receiver of claim 28:

wherein the wireless communicated signal comprises a plurality of time slots, and wherein each of the plurality of time slots comprises the first synchronization channel component; and wherein each of the first time sample period and the second time sample period has a duration equal to each of the plurality of time slots.

30. The wireless receiver of claim 27 wherein the circuitry for combining comprises circuitry for forming a sum by adding the first set to the second set.

31. The wireless receiver of claim 30 wherein the circuitry for combining further comprises circuitry for dividing the sum by two.

32. The wireless receiver of claim 28 wherein the circuitry for combining comprises circuitry for forming a scaled average with the first set and the second set.

33. The wireless receiver of claim 27 wherein the circuitry for combining comprises circuitry for forming a single pole average with the first set and the second set.

34. The wireless receiver of claim 27 wherein each of the plurality of correlation samples comprises an energy measure of a result of the step of correlating a first synchronization channel value to the wireless communicated signal.

* * * * *